(12) United States Patent
Tan et al.

(10) Patent No.: US 8,162,366 B1
(45) Date of Patent: Apr. 24, 2012

(54) SYSTEMS AND METHODS FOR GRIPPING A COMPONENT

(75) Inventors: Jit Han Tan, Petaling Jaya (MY); Wai Khuen Yee, Kuala Lumpur (MY)

(73) Assignee: Western Digital Technologies, Inc., Irvine, CA (US)

( * ) Notice: Subject to any disclaimer, the term of this patent is extended or adjusted under 35 U.S.C. 154(b) by 211 days.

(21) Appl. No.: 12/748,297

(22) Filed: Mar. 26, 2010

(51) Int. Cl.
*B25J 15/02* (2006.01)

(52) U.S. Cl. .......... 294/194; 294/207; 294/93; 294/213; 901/50; 414/729

(58) Field of Classification Search ............... 294/207, 294/195, 94, 96, 213, 93; 414/741, 729, 414/737; 901/50, 39, 30, 40
See application file for complete search history.

(56) References Cited

U.S. PATENT DOCUMENTS

| | | | |
|---|---|---|---|
| 4,416,577 A * | 11/1983 | Inaba et al. | 414/225.01 |
| 6,889,424 B2 | 5/2005 | Slife et al. | |
| 7,490,398 B1 | 2/2009 | Klassen et al. | |
| 2002/0024225 A1 * | 2/2002 | Ostholt | 294/94 |
| 2007/0185616 A1 | 8/2007 | Murray et al. | |
| 2008/0135065 A1 | 6/2008 | Yao et al. | |

* cited by examiner

*Primary Examiner* — Saul Rodriguez
*Assistant Examiner* — Gabriela Puig (57) ABSTRACT

A gripper assembly is provided. The gripper assembly comprises an actuator and a plurality of gripper fingers. The plurality of gripper fingers are slidably mounted on the actuator. The actuator is configured to slide each of the plurality of gripper fingers along a respective radial path perpendicular to a central axis of the gripper assembly. Each of the plurality of gripper fingers comprises a body and a vacuum evacuation path defined within the body. The body is configured to couple the vacuum evacuation path to a vacuum source and to evacuate particles from a grip area of the gripper assembly via the vacuum evacuation path when a vacuum is applied by the vacuum source.

20 Claims, 6 Drawing Sheets

600 actuating a plurality of gripper fingers of a gripper assembly along respective radial paths perpendicular to a central axis of the gripper assembly to engage a component
602 applying a vacuum to a vacuum evacuation path defined in a body of each of the plurality of gripper fingers to evacuate particles from a grip area of the gripper assembly
604

FIG. 6

SYSTEMS AND METHODS FOR GRIPPING A COMPONENT

FIELD

The present invention generally relates to manufacturing and assembly equipment and, in particular, relates to systems and methods for gripping a component.

BACKGROUND

Gripper assemblies may be used to pick up a component from one location and place the component in another location as part of a manufacturing process. Some gripping assemblies use gripper fingers to grip a component. For example, gripper fingers of a gripping assembly may be positioned against a component such that contact occurs between the component and the gripper fingers. To grip the component, a gripping force is applied to the component via the gripper fingers. However, abrasion may occur between the component and the gripper fingers as a result of the contact between the component and the gripper fingers. The abrasion may lead to shedding of contaminant particles from the component and/or the gripper fingers during the gripping process.

SUMMARY

According to various aspects of the subject disclosure, a gripper assembly is provided. In some aspects, the gripper assembly is capable of gripping a component and evacuating contaminant particles shed during the gripping process. In some aspects, the gripper assembly comprises an actuator and a plurality of gripper fingers. The plurality of gripper fingers are slidably mounted on the actuator. The actuator is configured to slide each of the plurality of gripper fingers along a respective radial path perpendicular to a central axis of the gripper assembly. Each of the plurality of gripper fingers comprises a body and a vacuum evacuation path defined within the body. The body is configured to couple the vacuum evacuation path to a vacuum source and to evacuate particles from a grip area of the gripper assembly via the vacuum evacuation path when a vacuum is applied by the vacuum source.

According to various aspects of the subject disclosure, a method for gripping a component is provided. The method comprises actuating a plurality of gripper fingers of a gripper assembly along respective radial paths perpendicular to a central axis of the gripper assembly to engage a component. The method also comprises applying a vacuum to a vacuum evacuation path defined in a body of each of the plurality of gripper fingers to evacuate particles from a grip area of the gripper assembly.

According to various aspects of the subject disclosure, a gripper assembly is provided. The gripper assembly comprises a pneumatic actuator and three gripper fingers. The three gripper fingers are slidably mounted on the pneumatic actuator. The pneumatic actuator is configured to slide each of the three gripper fingers along a respective radial path perpendicular to a central axis of the gripper assembly. The respective radial paths are equally spaced around a perimeter of the gripper assembly. Each of the three gripper fingers comprises a body, a vacuum evacuation path defined within the body, and a fitting. The vacuum evacuation path comprises an intake port arranged on an inward-facing surface of the body and an exhaust port. The fitting is attached to the exhaust port of the vacuum evacuation path. The fittings are configured to be coupled to a vacuum source to evacuate particles from a grip area of the gripper assembly via the vacuum evacuation paths when a vacuum is applied by the vacuum source.

Additional features and advantages of the subject disclosure will be set forth in the description below, and in part will be apparent from the description, or may be learned by practice of the subject disclosure. The advantages of the subject disclosure will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject disclosure and are incorporated in and constitute a part of this specification, illustrate aspects of the subject disclosure and together with the description serve to explain the principles of the subject disclosure.

DETAILED DESCRIPTION

In the following detailed description, numerous specific details are set forth to provide a full understanding of the subject disclosure. It will be apparent, however, to one ordinarily skilled in the art that the subject disclosure may be practiced without some of these specific details. In other instances, well-known structures and techniques have not been shown in detail so as not to obscure the subject disclosure.

A hard disk drive (HDD) has very small working gaps in which particulate contamination can affect reliability and possibly lead to complete failure of the HDD. For example, the slider and the suspension of a headstack assembly are positioned very close (e.g., tens of nanometers) to the surface of a spinning disk during read and write processes. Loose particles within the HDD may be become entrapped between the slider or suspension and the surface of the disk leading to permanent damage from abrasive wear as the disk is rotated. Thus, during the assembly process of an HDD, it is beneficial to minimize the amount of contaminant particles that the HDD is exposed to. In particular, it is desirable to provide HDD assembly tools that enhance the cleanliness level during the HDD assembly process.

During the assembly process of an HDD, a gripper assembly is used to pick up an HDD component from one location and place the HDD component in another location. For example, the gripper assembly may use gripper fingers to pick up an HDD component and place it within the HDD during the assembly process. However, the contact between the gripper fingers and the HDD component (e.g., a metal to metal interface) may result in abrasion between the gripper fingers and the HDD component. The abrasion may lead to shedding of contaminant particles from the gripper fingers and/or the HDD component during the gripping process. Therefore, it is desirable to evacuate contaminant particles that are shed during the gripping process.

Figure 1:
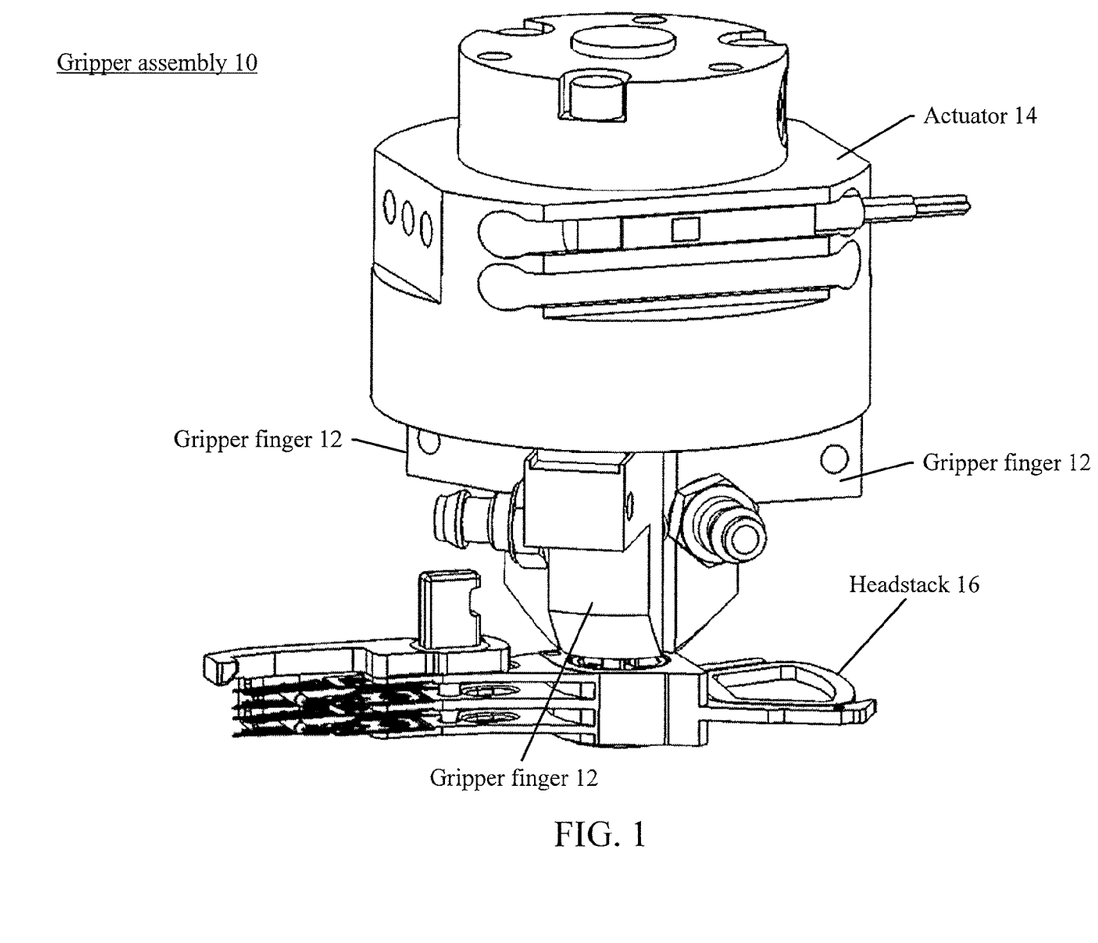
FIG. 1 illustrates an example of a gripper assembly, in accordance with various aspects of the subject disclosure.

FIG. 1 illustrates an example of gripper assembly 10, in accordance with various aspects of the subject disclosure. Gripper assembly 10 comprises actuator 14 and a plurality of gripper fingers 12. In some aspects, actuator 14 may be a pneumatic actuator. Gripper assembly 10 may be used to grip various HDD components. For example, as shown in FIG. 1, gripper assembly 10 is used to grip headstack 16 of an HDD. Actuator 14 may control the movement of each gripper finger 12 such that the gripper fingers 12 engage headstack 16 for gripping headstack 16. For example, actuator 14 may be a multi-jaw actuator having sliding jaws for moving gripper fingers 12 towards and away from one another for gripping headstack 16.

Figure 2:
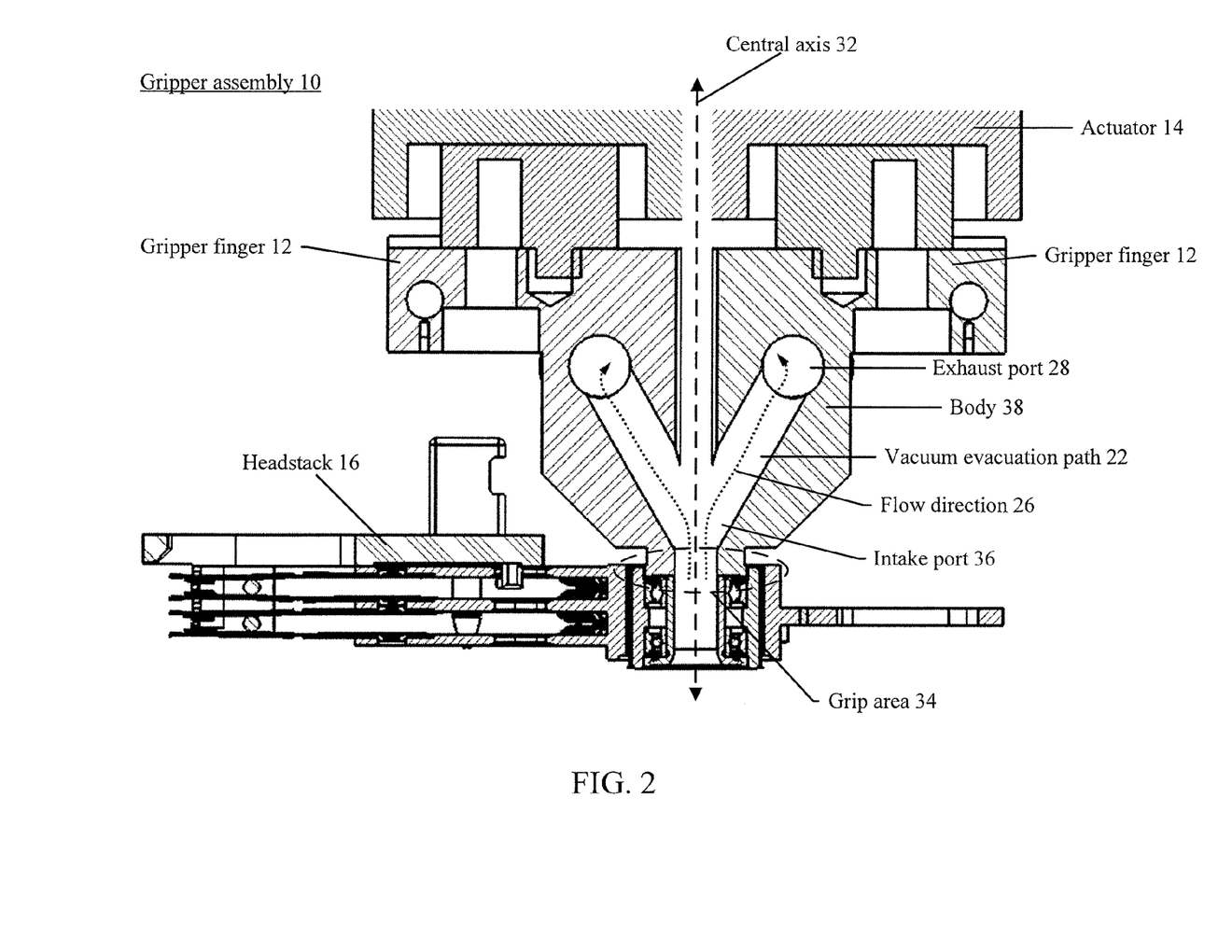
FIG. 2 illustrates a cross-sectional view of a gripper assembly, in accordance with various aspects of the subject disclosure.

FIG. 2 illustrates a cross-sectional view of gripper assembly 10, in accordance with various aspects of the subject disclosure. Gripper fingers 12 are slidably mounted on actuator 14. Thus, gripper fingers 12 may slide toward and away from central axis 32 of gripper assembly 10. Gripper assembly 10 may be lowered such that the distal ends of gripper fingers 12 are lowered into a pivot sleeve of headstack 16, for example as shown in grip area 34, until the distal ends of gripper fingers 12 make contact with the top surface of the inner sleeve of the pivot sleeve. After this occurs, actuator 14 may slide each gripper finger 12 outward away from central axis 32 to engage the outer sleeve of the pivot sleeve for gripping headstack 16. Grip area 34 may be an area where contact occurs between gripper fingers 12 and the component to be picked up by gripper assembly 10. In this example, grip area 34 is an area below gripper fingers 12 and above the pivot sleeve of headstack 16. The contact between each gripper finger 12 and the pivot sleeve of headstack 16 may result in contaminant particles being shed in grip area 34 during the gripping process. According to various aspects of the subject disclosure, gripper assembly 10 is capable of gripping headstack 16 and evacuating contaminant particles shed during the gripping process.

In some aspects, each gripper finger 12 comprises body 38 and vacuum evacuation path 22 defined within body 38. Body 38 is configured to couple vacuum evacuation path 22 to a vacuum source (not shown) and to evacuate particles from grip area 34 of gripper assembly 10 via vacuum evacuation path 22 when a vacuum is applied by the vacuum source. For example, each vacuum evacuation path 22 comprises exhaust port 28 and intake port 36. The vacuum source may be coupled to exhaust port 28 of vacuum evacuation path 22. The vacuum source may apply a vacuum such that contaminant particles from grip area 34 are evacuated through intake port 36, along vacuum evacuation path 22, through exhaust port 28, and towards the vacuum source. The path of the contaminant particles is illustrated, for example, by flow direction 26. Thus, the subject technology is beneficial in reducing the amount of contaminant particles from grip area 34 during a gripping process. In some aspects, the amount of contaminant particles from grip area 34 may be reduced by about 98% to 100% as compared to gripper assemblies that are incapable of evacuating contaminant particles.

In some aspects, the vacuum may be applied at a pressure of 26 inches of Mercury (in Hg). The vacuum may also be applied such that a flowrate of 350 liters per minute (l/min) through vacuum evacuation path 22 is created. In some aspects, this pressure and/or flow rate is sufficiently strong to evacuate the contaminant particles from grip area 34. The subject technology, however, is not limited to this pressure and/or flowrate. It would be apparent to those of ordinary skill in the art that higher or lower pressures and/or flowrates may be applied or created depending on the amount of contaminant particles to be evacuated, the size of the contaminant particles to be evacuated, and/or the desired rate at which the contaminant particles are to be evacuated. In some aspects, the vacuum may be applied while gripper fingers 12 are engaged to headstack 16. In some aspects, the vacuum is applied before gripper fingers 12 make contact with headstack 16.

Figure 3A:
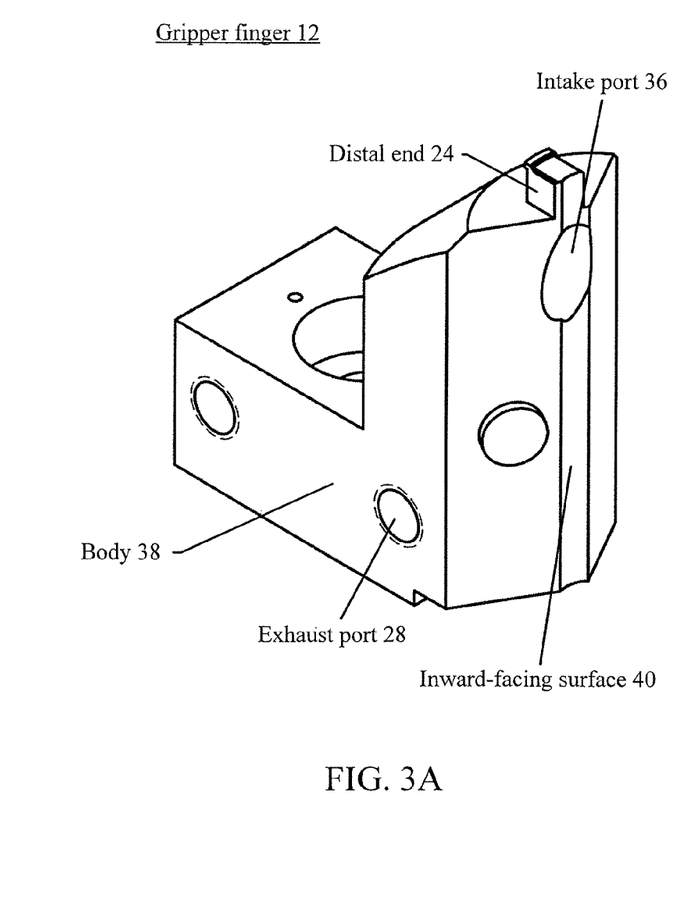
FIGS. 3A and 3B illustrate an example of a gripper finger, in accordance with various aspects of the subject disclosure.
Figure 3B:
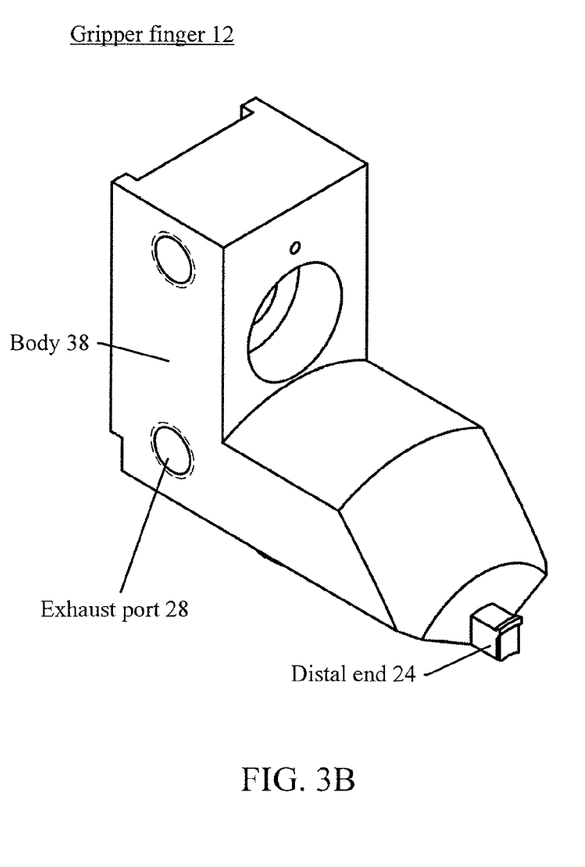

FIGS. 3A and 3B illustrate an example of gripper finger 12, in accordance with various aspects of the subject disclosure. Gripper finger 12 may be made of grade 440C stainless steel or other suitable material that is sufficiently strong to sustain a gripping force on various components and is also durable enough to be used frequently without shedding a large amount of contaminant particles as a result of repeated contact between gripper finger 12 and the components to be gripped. For example, gripper finger 12 may be polished hardened stainless steel of grade 440C and with a Rockwell hardness of HRC 55-60.

In some aspects, intake port 36 is oriented towards distal end 24 of body 38. For example, intake port 36 may be oriented towards grip area 34 (e.g., as shown in FIG. 2). This orientation may ensure that contaminant particles from grip area 34 are evacuated directly into intake port 36. In some aspects, intake port 36 of vacuum evacuation path 22 is arranged on inward-facing surface 40 of body 38. For example, inward-facing surface 40 may be the surface of body 38 that faces central axis 32 of gripper assembly 10. Such an arrangement allows for contaminant particles from grip area 34 to be evacuated through any of the intake ports 36 of the plurality of gripper fingers 12. This may be advantageous, for example, when only one gripper finger 12 is coupled to a vacuum source. Although only one gripper finger 12 is coupled to the vacuum source, the same gripper finger 12 may nevertheless be able facilitate the evacuation of contaminant particles from grip area 34, including contaminant particles that are a result of abrasion between headstack 16 and a different gripper finger 12.

According to various aspects of the subject disclosure, gripper finger 12 may be adapted to replace a gripper finger from conventional gripper assemblies. Doing so may enable those gripper assemblies to grip a component and evacuate contaminant particles shed during the gripping process.

Figure 4:
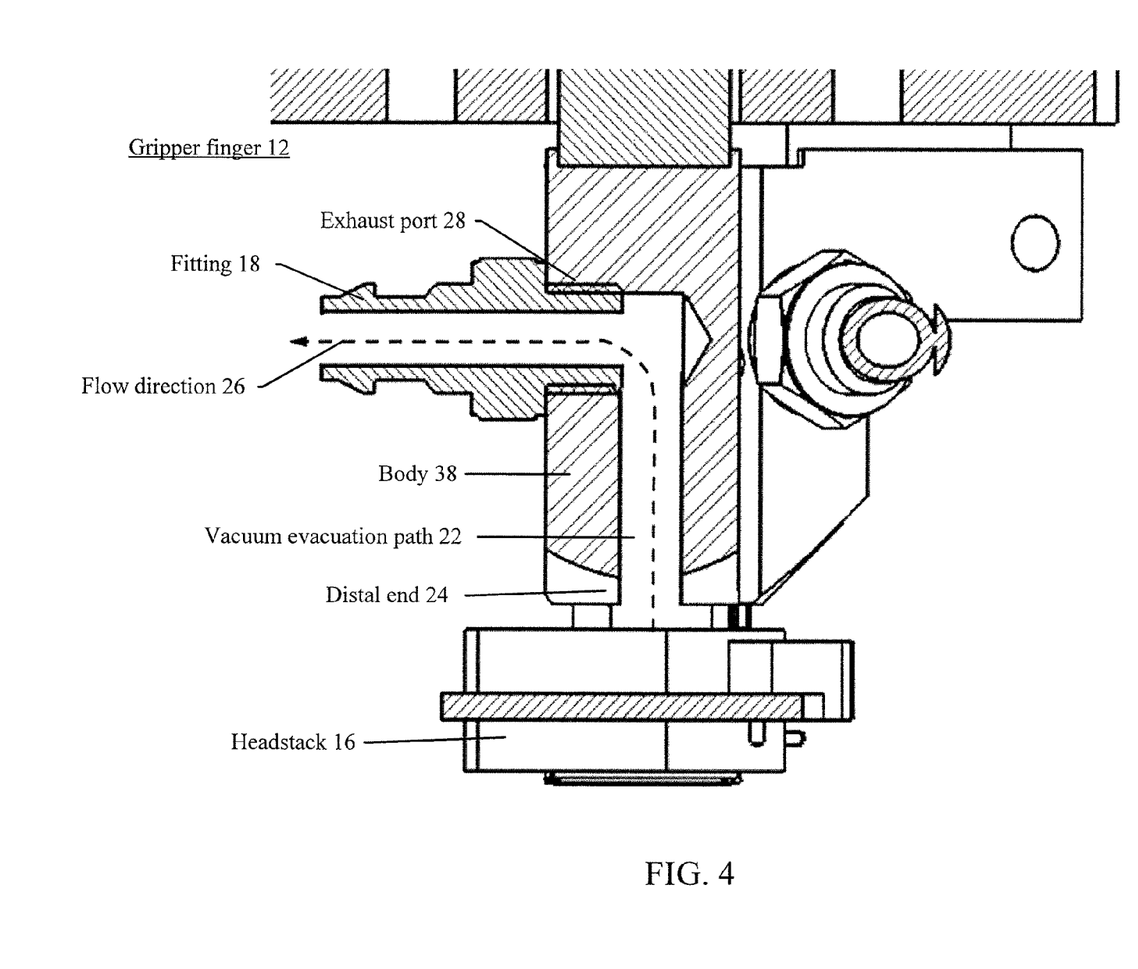
FIG. 4 illustrates a cross-sectional view of a gripper finger, in accordance with various aspects of the subject disclosure.

FIG. 4 illustrates a cross-sectional view of gripper finger 12, in accordance with various aspects of the subject disclosure. In some aspects, gripper finger 12 comprises fitting 18 attached to exhaust port 28 of vacuum evacuation path 22. Fitting 18 may be used to couple vacuum evacuation path 22 to a vacuum source (not shown). While one end of fitting 18 is attached to exhaust port 28, another end of fitting 18 may be configured to attach to a hose, tube, or pipe from the vacuum source. In some aspects, exhaust port 28 may be threaded so that fitting 18 can be attached to exhaust port 28 by screwing fitting 18 into the threaded exhaust port 28. In some aspects, the vacuum source may be attached directly to exhaust port 28 (e.g., using a hose, tube, pipe, or other suitable mechanism) without the use of fitting 18.

Contaminant particles may be evacuated from grip area 34 through the path as illustrated by flow direction 26. In some aspects, gripper assembly 10 may comprise a filter (e.g., a filter cartridge) configured to be placed between vacuum evacuation path 22 and the vacuum source to capture particles evacuated from grip area 34. For example, a filter may be placed between fitting 18 and the vacuum source. Thus, the filter may be placed at the end of fitting 18 that is attached to a hose, tube, or pipe from the vacuum source. However, the filter may be placed at any suitable location along vacuum evacuation path 22 and/or flow direction 26 as long as the filter may sufficiently capture particles evacuated from grip area 34.

Figure 5:
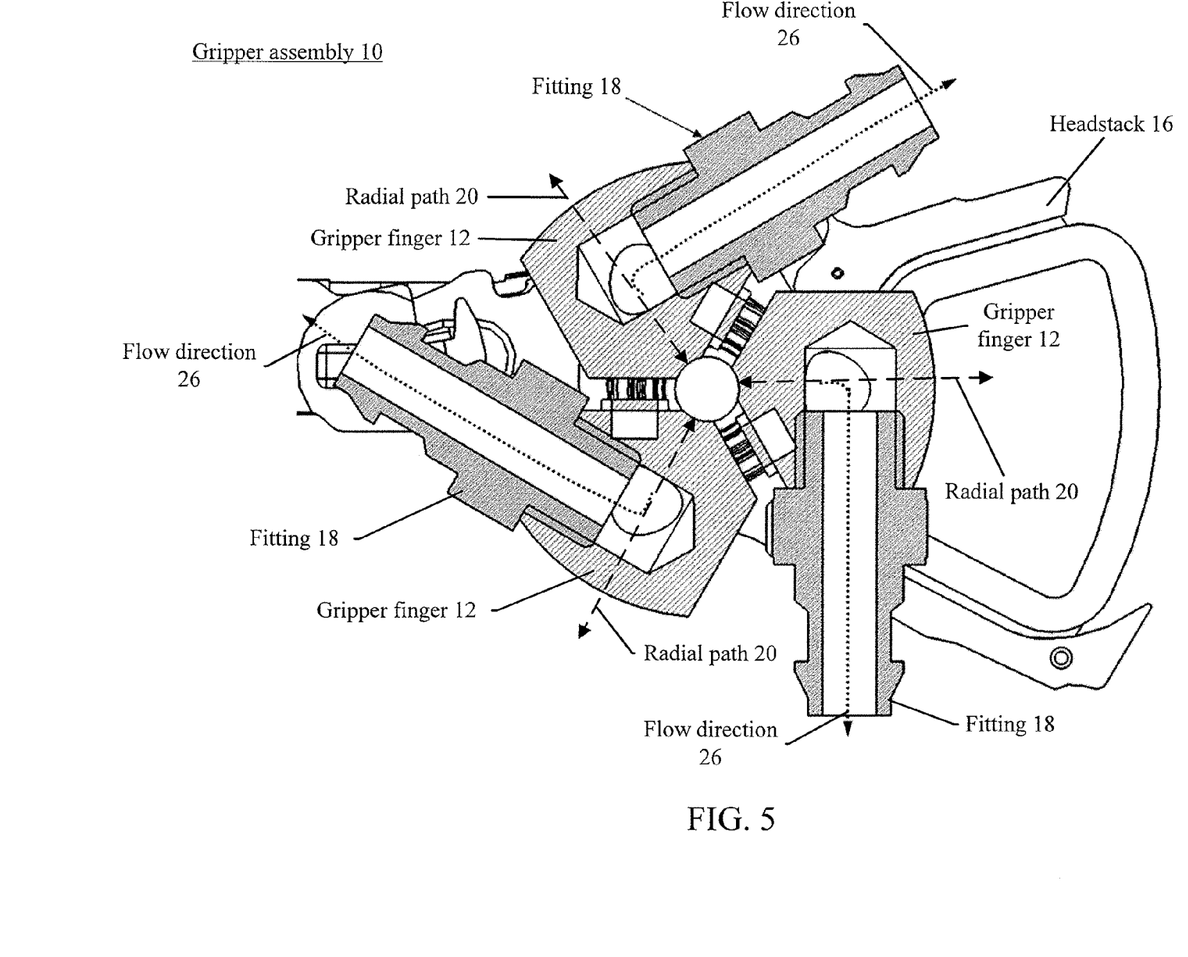
FIG. 5 illustrates a top view of a gripper assembly, in accordance with various aspects of the subject disclosure.

FIG. 5 illustrates a top view of gripper assembly 10, in accordance with various aspects of the subject disclosure. As shown in this figure, gripper assembly 10 comprises three gripper fingers 12. Actuator 14 is configured to slide each gripper finger 12 along a respective radial path 20 for gripping components. In some aspects, the respective radial paths 20 are equally spaced around a perimeter of gripper assembly 10 and are perpendicular to central axis 32. In one example, actuator 14 may slide each gripper finger 12 inward towards central axis 32 so that the respective distal ends 24 of the three gripper fingers 12 are close together. Gripper assembly 10 may then be lowered such that the distal ends 24 of the three gripper fingers 12 are lowered into a pivot sleeve of headstack 16 until the distal ends 24 make contact with the top surface of the inner sleeve of the pivot sleeve. After this occurs, actuator 14 may slide each gripper finger 12 outward along the respective radial path 20 to engage the outer sleeve of the pivot sleeve for gripping headstack 16. Although three gripper fingers 12 are shown in FIG. 5, more or less gripper fingers 12 may be used to grip a component depending on the shape of the component, the size of the component, the desired gripping force to be applied by each gripper finger 12, or other factors known to those of ordinary skill in the art.

Figure 6:
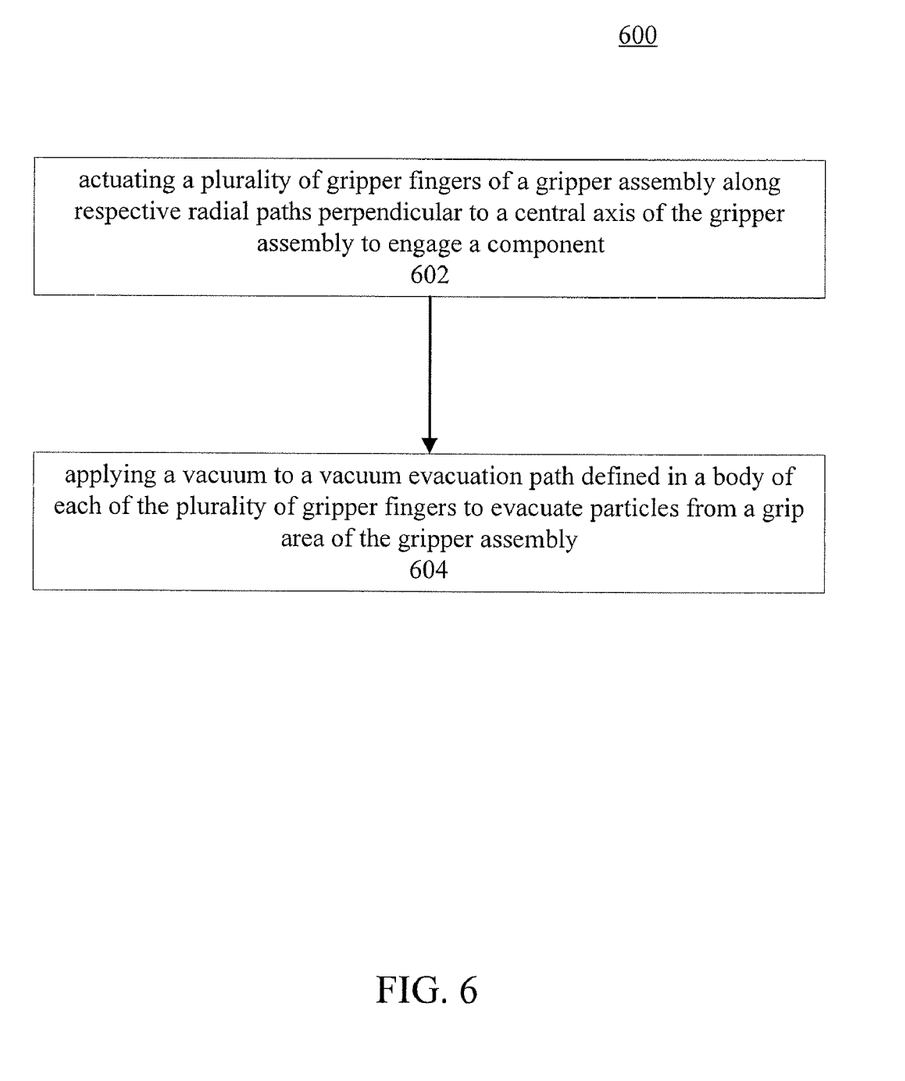
FIG. 6 illustrates a method for gripping a component, in accordance with various aspects of the subject disclosure.

FIG. 6 illustrates method 600 for gripping a component, in accordance with various aspects of the subject disclosure. Method 600 comprises actuating a plurality of gripper fingers of a gripper assembly along respective radial paths perpendicular to a central axis of the gripper assembly to engage a component (step 602). For example, step 602 may be applied when moving three gripper fingers 12, as shown in FIG. 5, to grip headstack 16. Method 600 also comprises applying a vacuum to a vacuum evacuation path defined in a body of each of the plurality of gripper fingers to evacuate particles from a grip area of the gripper assembly (step 604). For example, step 604 may be applied when gripper fingers 12 (e.g., as shown in FIG. 2) are used to grip headstack 16, and the contaminant particles from grip area 34 can be evacuated along flow direction 26.

The foregoing description is provided to enable a person skilled in the art to practice the various configurations described herein. While the subject disclosure has been particularly described with reference to the various figures and configurations, it should be understood that these are for illustration purposes only and should not be taken as limiting the scope of the subject disclosure.

There may be many other ways to implement the subject disclosure. Various functions and elements described herein may be partitioned differently from those shown without departing from the scope of the subject disclosure. Various modifications to these configurations will be readily apparent to those skilled in the art, and generic principles defined herein may be applied to other configurations. Thus, many changes and modifications may be made to the subject disclosure, by one having ordinary skill in the art, without departing from the scope of the subject disclosure.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject disclosure. Moreover, nothing disclosed herein is intended to be dedicated to the public regardless of whether such disclosure is explicitly recited in the above description.

What is claimed is:

1. A gripper assembly comprising:
an actuator; and
a plurality of gripper fingers slidably mounted on the actuator, wherein the actuator is configured to slide each of the plurality of gripper fingers along a respective radial path perpendicular to a central axis of the gripper assembly, wherein each of the plurality of gripper fingers comprises:
a body; and
a vacuum evacuation path defined within the body, wherein the body is configured to couple the vacuum evacuation path to a vacuum source and to evacuate particles from a grip area of the gripper assembly via the vacuum evacuation path when a vacuum is applied by the vacuum source.

2. The gripper assembly of claim 1, wherein each of the plurality of gripper fingers further comprises a fitting attached to an exhaust port of the vacuum evacuation path defined within the body, wherein the fitting is configured to attach to a hose from the vacuum source.

3. The gripper assembly of claim 2, wherein the exhaust port is threaded and the fitting is screwed into the threaded exhaust port.

4. The gripper assembly of claim 1, wherein an intake port of the vacuum evacuation path defined within the body is arranged on an inward-facing surface of the body.

5. The gripper assembly of claim 4, wherein the intake port is oriented towards a distal end of the body.

6. The gripper assembly of claim 1, wherein the actuator is a pneumatic actuator.

7. The gripper assembly of claim 1, wherein the gripper assembly comprises three gripper fingers, and wherein the respective radial paths are equally spaced around a perimeter of the gripper assembly.

8. The gripper assembly of claim 1, wherein the plurality of gripper fingers are made of grade 440C stainless steel.

9. The gripper assembly of claim 1, wherein the actuator is configured to slide each of the plurality of gripper fingers outward along the respective radial path to engage an inner surface of a component.

10. The gripper assembly of claim 1, further comprising a filter configured to be placed between the vacuum evacuation path defined within the body and the vacuum source to capture particles evacuated from the grip area.

11. A method for gripping a component, the method comprising:
    actuating a plurality of gripper fingers of a gripper assembly along respective radial paths perpendicular to a central axis of the gripper assembly to engage a component; and
    applying a vacuum to a vacuum evacuation path defined in a body of each of the plurality of gripper fingers to evacuate particles from a grip area of the gripper assembly.

12. The method of claim 11, further comprising:
    slidably mounting the plurality of gripper fingers on an actuator of the gripper assembly, wherein the actuator is operable to slide the plurality of gripper fingers along the respective radial paths.

13. The method of claim 12, wherein actuating the plurality of gripper fingers comprises sliding the plurality of gripper fingers outward along the respective radial paths to engage an inner surface of the component.

14. The method of claim 11, further comprising coupling a vacuum source to the vacuum evacuation paths of the plurality of gripper fingers.

15. The method of claim 14, further comprising:
    attaching a fitting to an exhaust port of each of the vacuum evacuation paths of the plurality of gripper fingers,
    wherein coupling the vacuum source to the vacuum evacuation paths comprises attaching a hose from the vacuum source to each of the fittings.

16. The method of claim 15, wherein the exhaust port is threaded, and wherein attaching the fitting comprises screwing the fitting into the threaded exhaust port.

17. The method of claim 11, wherein the vacuum is applied at a pressure of 26 inches of Mercury (in Hg).

18. The method of claim 11, wherein the vacuum is applied such that a flowrate of 350 liters per minute (l/min) through the vacuum evacuation path is created.

19. The method of claim 11, further comprising:
    placing a filter between the vacuum evacuation paths of the plurality of gripper fingers and the vacuum source to capture particles evacuated from the grip area of the gripper assembly.

20. A gripper assembly comprising:
    a pneumatic actuator;
    three gripper fingers slidably mounted on the pneumatic actuator, wherein the pneumatic actuator is configured to slide each of the three gripper fingers along a respective radial path perpendicular to a central axis of the gripper assembly, wherein the respective radial paths are equally spaced around a perimeter of the gripper assembly, and wherein each of the three gripper fingers comprises:
    a body;
    a vacuum evacuation path defined within the body, wherein the vacuum evacuation path comprises an intake port arranged on an inward-facing surface of the body and an exhaust port; and
    a fitting attached to the exhaust port of the vacuum evacuation path,
    wherein the fittings are configured to be coupled to a vacuum source to evacuate particles from a grip area of the gripper assembly via the vacuum evacuation paths when a vacuum is applied by the vacuum source.

* * * * *